C. S. BRADLEY.
APPARATUS FOR CONCENTRATION OF ORE VALUES.
APPLICATION FILED AUG. 4, 1911. RENEWED OCT. 3, 1912.

1,066,880.

Patented July 8, 1913.
6 SHEETS—SHEET 1.

Witnesses:

Inventor
Charles S. Bradley
By his Attorneys

C. S. BRADLEY.
APPARATUS FOR CONCENTRATION OF ORE VALUES.
APPLICATION FILED AUG. 4, 1911. RENEWED OCT. 3, 1912.

1,066,880.

Patented July 8, 1913.

Witnesses:
Octavius Knight.
H. H. Knight

Inventor
Charles S. Bradley
By his Attorneys Knight Bro

C. S. BRADLEY.
APPARATUS FOR CONCENTRATION OF ORE VALUES.
APPLICATION FILED AUG. 4, 1911. RENEWED OCT. 3, 1912.

1,066,880.

Patented July 8, 1913.

C. S. BRADLEY.
APPARATUS FOR CONCENTRATION OF ORE VALUES.
APPLICATION FILED AUG. 4, 1911. RENEWED OCT. 3, 1912.

1,066,880.

Patented July 8, 1913.

C. S. BRADLEY.
APPARATUS FOR CONCENTRATION OF ORE VALUES.
APPLICATION FILED AUG. 4, 1911. RENEWED OCT. 3, 1912.

1,066,880.

Patented July 8, 1913.

UNITED STATES PATENT OFFICE.

CHARLES S. BRADLEY, OF NEW YORK, N. Y., ASSIGNOR TO BRADLEY COPPER PROCESS COMPANY, OF JERSEY CITY, NEW JERSEY, A CORPORATION OF NEW JERSEY.

APPARATUS FOR CONCENTRATION OF ORE VALUES.

1,066,880.      Specification of Letters Patent.      Patented July 8, 1913.

Original application filed August 31, 1909, Serial No. 515,536. Divided and this application filed August 4, 1911, Serial No. 642,284. Renewed October 3, 1912. Serial No. 723,816.

*To all whom it may concern:*

Be it known that I, CHARLES S. BRADLEY, a citizen of the United States, residing in New York, borough of Manhattan, State of New York, have invented new and useful Improvements in Apparatus for Concentration of Ore Values; and in order that those skilled in the art may understand and practise my invention I give the following specification, reference being had to the accompanying drawings.

The present application is a division of a prior application filed by me on August 31st, 1909, Serial No. 515,536, entitled Concentration of ore values.

My invention relates to the concentration or recovery of ore values and more particularly to the rapid and complete concentration of copper from its ores in an economical and commercially practical manner.

Although the copper industry is one of the oldest in existence and the copper market is one of the largest at the present time, only two thirds of the copper mined is recovered from the ore. This loss or waste of one third of the ore value is due to the fact that under existing conditions of operation it costs more to recover it than it is worth after it has been recovered. The prevention of this waste has occupied the attention of scientists for many years, and a great number of methods have been proposed for the solution of the problem. In certain grades of ore smelting is usually resorted to directly for recovering the greater portion of the metal and the waste from this contains in the aggregate large quantities of metal, but proportionately such a small part of the entire mass of material that it can not be recovered commercially under existing conditions. In other cases where the ore is low grade, mechanical and other treatments have been resorted to to eliminate so far as practicable the gangue and non-metallic portions of the mass, so that the larger portion of the metal remaining in the concentrate forms a sufficiently high grade ore for manipulation under known processes, but considerable loss of the values occurs in the tailings. In other instances there are many deposits of ore carrying values which are in such small proportions to the total mass that it does not pay to recover the metal.

The object of my invention is mainly to provide a method and apparatus for practically complete extraction or concentration of metal whether in low grade ores such as those referred to or in high grade ores, under conditions which are commercially practical.

The ores of copper and the conditions under which they must be worked are so various that any general scheme for the recovery of this metal should lend itself to the modification necessary to suit the requirements of each particular instance. It will thus be understood that in describing the general principle of my invention and showing its adaptation to the treatment of certain types of ore under certain conditions, my intention is but to indicate to those skilled in this art the functions and utility of its several features, and thus enable them to adapt the treatment to any particular case. In some instances certain parts may be unnecessary while in other cases additional features may be found desirable; or some parts may be substituted for those which I have selected to illustrate the invention.

The general principle underlying my invention is the conversion of the copper contents into a soluble form and the subsequent dissolving out of the same. This general principle is not broadly new, but so far as I am aware has never been employed in commercial practice to effect the rapid and economical separation of the copper from the ore. As an example of the process, I may refer to the formation of a sulfate of copper which is subsequently dissolved out, filtered and, if desired, washed and recovered in the form of crystals or a precipitate, which may, if desired, be further treated by suitable methods and apparatus to reduce the copper to metallic form. Some ores will contain in themselves the necessary elements to form a sulfate, while others may entirely lack or have insufficient sulfur and hence require the addition of acid to effect this. In order to illustrate the treatment of either of these kinds, I may select as an example of my invention a system for the treatment of any of these ores. It will be understood, however, that where the ore contains all the necessary elements in the proper proportions the addition of outside acid will be unnecessary and furthermore where the ore contains insufficient sulfur to form the sulfate or even contains no sulfur at all, the supply of outside acid will be correspondingly regulated. Furthermore in many instances the ore will contain more than an equivalent of sulfur and thus produce the free sulfuric acid for the ores which require outside acid.

Samples of ore from important mines in this country may be represented in the following analyses:

| A. | | B. | | C. | |
|---|---|---|---|---|---|
| Cu | 2.58% | $H_2O$ | 1.97 | $H_2O$ | 2.31 |
| $SiO_2$ | 59.70 | SiO | 59.07 | SiO | 58.02 |
| $Al_2O_3$ | 13.05 | Cu | 2.58 | Fe | 4.56 |
| $Fe_2O_3$ | 10.76 | $Fe_2O_3$ | 5.26 | $Al_2O_3$ | 17.82 |
| CaO | .29 | TeO | 4.41 | $TiO_2$ | .54 |
| MgO | .14 | $Te_7S_8$ | .04 | $P_2O_5$ | .05 |
| $P_2O_5$ | .31 | $Al_2O_3$ | 13.05 | CaO | .59 |
| $TiO_2$ | .32 | CaO | .29 | MgO | .08 |
| S | 2.12 | MgO | .14 | K and NaO | 3.12 |
| $K_2O$ | 2.81 | $P_2O_5$ | .31 | Lead | .22 |
| $Na_2O$ | .13 | $TiO_2$ | .32 | Arsenic | .34 |
| Ag | Trace | $Na_2O$ | .13 | Zinc | .56 |
| Cl | " | $K_2O$ | 2.81 | Anti | Trace |
| Pb | None | F | .01 | Cu | 2.68 |
| | | $CO_2$ | .18 | S | 5.32 |
| | | Cl | Trace | | |
| | | $SnO_2$ | " | | |
| | | Sulfur | 2.12 | | |

It will be noted that these ores contain enough sulfur when it is converted to sulfuric acid and when the copper is converted to an oxid, to make the copper content soluble as sulfate of copper. If we refer to the formula for sulfate of copper ($CuSO_4$) we see that it contains one half the quantity of sulfur that it does of copper, or 64 pounds of copper will be united with 32 pounds of sulfur plus the requisite amount of oxygen. Another way of viewing this is that one per cent. of sulfur is sufficient for the solution of two per cent. of copper. If properly treated these ores contain all the material necessary for their own extraction except the oxygen to be obtained from the air, and air being present at all times, we need not consider it from this point of view.

It is thought that the invention will be more easily understood by employing expressive names for the salts produced and also special names for the pieces of apparatus employed. I find such expressive names in literature although rarely used; thus an amphigen is an element that combines with metals to form either an acid or a base, of which oxygen is the best example. An amphid is a salt consisting of an acid and a base each containing an amphigen. Of these sulfate of copper is an excellent example ($CuO+SO_3$). An apparatus that produces an amphid—sulfate of copper for example—from its ores in one operation, although the salt remains mixed with the gangue, may be referred to as an amphidizer.

Among the essentials of commercial concentration by chemical methods are continuity of the process, rapidity and completeness of extraction, and capacity for treatment of large quantities of ore. The attainment of these and the carrying out of my invention will appear in connection with the apparatus I have devised therefor and which forms a part thereof. Such apparatus is illustrated in the accompanying drawings in which—

In the several views, the same numerals of reference are applied to corresponding parts.

In treating the ores according to my invention they are first crushed to a suitable fineness. The degree of fineness will vary according to the character of the ore or gangue treated; for example a friable porous ore will not require to be reduced to such a degree of fineness as a harder or more dense ore. As a general instance, crushing to a 10 mesh size may be given as indicating the degree of fineness.

As already stated, the treatment of the crushed ore will vary according to circumstances and the form in which the copper and other metals are present. Assuming for the sake of clearness the treatment of ores such as the samples A, B and C, the first step will in most cases be to sulfate the copper by the sulfur contained in the ore. For this purpose I have designed a special apparatus which I designate the amphidizer, and the details of which do not form a part of my present invention, but are fully set forth in an application filed by me on Aug. 31, 1909, Ser. No. 515,538 entitled Amphidizing apparatus and method, and hence need only a general description and representation herein. This amphidizer which I prefer to use when the ore contains sufficient sulfur for effecting partial or complete sulfatizing of the copper, comprises briefly stated an ore hopper *a* from which the crushed ore is continuously fed through a neck *b* into a revolving drum *c* through which the ore passes by one series of passageways supplied with air to the far end and returns by another series of passageways to the feed end where it is discharged through a chute or other device *d* into apparatus hereinafter described. A heating flue extends longitudinally through the middle of the rotating drum *c* so that the ore passing into the drum may be heated. The two passageways in the rotating drum *c* are so arranged that the returning ore gives up heat to the incoming ore so that a regeneration and conservation is maintained, and this temperature preferably being kept at about 550° C. At this temperature the sulfate of iron which may have been formed is reduced but the copper sulfate remains. When the heat generated by the chemical action in the ore is sufficient to maintain the temperature the supply of heat from the external source is discontinued and when the temperature exceeds the desired degree artificial cooling is employed.

The character of the product from the amphidizer will of course, vary according to the character of the ore which was fed into it. If for instance the ore contained particles of free copper, and especially when these were too large to be completely oxidized by the air and thus were not amphidized in the amphidizer, the resultant ore will still contain this copper in a form which is not suited to the formation of sulfate directly. In such cases the subsequent treatment will include a further oxidation step which may take place in the portion of the apparatus which I call the reaction drum, and in which the formation of the sulfate of copper is completed, either by the further oxidation and subsequent change to sulfate or by the change to sulfate of the already sufficiently oxidized copper or both. It should be noted that this completion of the formation of sulfate is also an amphidization as well as that which takes place in the primary amphidizer, but to distinguish the one apparatus from the other I employ the term "amphidizer" only in connection with the primary amphidizer.

Figures 2, 3, 4:
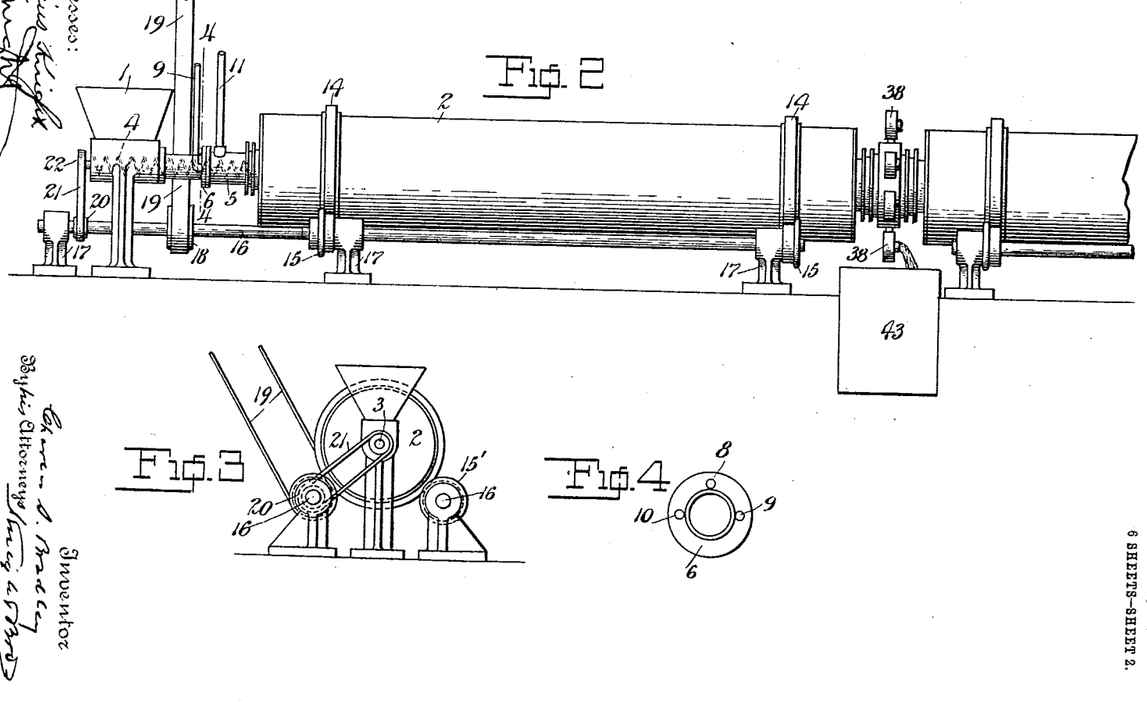
Fig. 2 represents an elevation of the reaction drum or portion of the system.
Fig. 3 represents an end elevation viewed from the left of Fig. 2.
Fig. 4 is a detail end view on the line 4—4 of Fig. 2.

Proceeding continuously from the amphidizer, the resultant mass is delivered through a chute *d* into the feed end or hopper 1 of the secondary amphidizer or reaction drum 2. Through the bottom of the hopper passes a conveyer 3 which extends through a feed trunk 4, the latter passing through the head of the reaction drum 2, delivering the material into the drum. A neck 5 is arranged concentrically around the feed trunk 4 forming therewith an annular chamber opening into the drum 2. This chamber is closed at its outer end by a flange 6 (see Fig. 4) and has a stuffing box connection 7 with the drum 2. The reagents for treating the ore are delivered to this annular chamber or passage by pipes 8, 9, 10 and 11, and pass thence into the drum. It will be understood that the material forming this chamber or passage should be proof against acids and for this purpose, if of metal, should be lead lined, or the parts themselves may be of stoneware or the like. It will be seen that the ore and the reagents are fed into the drum at the same end thereof. The conveyer for the ore is shown as of the helical form, and the bottom of the hopper should be partially or semi-cylindrical to conform to the conveyer. It will be seen that with the arrangement described the end of the drum is sealed, the ore itself forming a seal, so that access of air to the interior of the drum or escape of vapor or gas therefrom is prevented.

The drum 2 is shown of cylindrical form and is preferably built of an outer shell 12 of wood or wooden lagging and an inner lining 13 of porcelain or stoneware brick bedded and set in hydraulic cement. Circumferential bearing rings 14—14 are provided by which the drum is rotatably mounted on sets of rollers 15—15′. One set of these rollers 15—15 are fast on a driving shaft 16—16 supported in bearings 17. The other set of rollers 15′ are supporting idlers. The shaft 16 is driven by a pulley 18 having driving connection 19 with a motor or other suitable source of power (not shown). On the shaft 16 is another pulley 20 which has driving connection 21 with a pulley 22 on the shaft of the conveyer 3.

Drum 2 in its interior construction is cylindrical throughout its length except for a portion at its discharge end, where its internal diameter is gradually lessened as will be hereinafter more fully explained. The cylindrical portion of the drum is formed with inwardly projecting longitudinal flanges or ribs 23 built up of the brick lining. At the discharge end, the interior of the drum is conical and is provided with an internal conical helix 24 of varying pitch. This helix 24 is built up of the brick lining, and is interrupted or broken to provide a series of gaps 25 arranged in staggered lines so that the gaps in one portion of the helix do not come opposite gaps in an adjacent portion of the helix. The pitch of the helix is constantly changed or varies so that the space between adjacent portions of the helix gradually widens toward the end of the drum. The pitch is preferably so designed that the increase of pitch between successive threads is sufficient to equalize the carrying capacity of the successive inter-thread spaces so that the material will feed uniformly forward, notwithstanding the successively diminishing diameter of the drum.

The purpose of the construction described is that the ore and solvents fed into the drum at the feed end will be under constant agitation, tumbling and mixing by reason of the longitudinal ribs 23 which carry the material up in the rotation of the drum and allow the same to drop back so that a thorough presentation of the ore to the action of the solvents or reagents in the drum is obtained. The conical portion of the drum gradually lifts and conveys the material to the axial outlet of the drum, the gaps or inter-spaces 25 in the helix permitting the liquids to drain back while the solid material is carried forward, thus maintaining the liquid level in the reaction drum.

The discharge end of the reaction drum is formed with an elongated neck or discharge 26 which projects into the drum 27 which for convenience I have termed the separating drum. This neck portion is also provided with an interrupted helical rib or fin $26^a$ of uniform pitch to insure the discharge of the ore into the separating drum 27.

The separating drum 27 is constructed similarly to the reaction drum 2, that is, it is built up of an exterior wooden shell or lagging 28 and with an interior lining 29 formed of porcelain or stoneware brick set in cement. As distinguished from drum 2, however, this separating drum 27 is provided throughout its length with an interrupted helix 30 and near the discharge end is also formed with an interior conical portion provided with a helix of varying pitch similar to that described for the reaction drum 2. At its discharge end this drum also has a neck portion $27^a$ of reduced diameter similar to drum 2, and this neck portion is also provided with an internal helix $30^a$ of uniform pitch. The head 31, (Fig. 5) of this separating drum 27, next the reaction drum, is formed with a collar or neck 32 larger in diameter than the neck 26 of the reaction drum, which it surrounds, so that there is formed between the two necks an annular passage 33 which communicates with the interior of the separating drum 27 and also with a hollow annular chamber 34, within a hollow casting 35 which surrounds the end of the neck 32 of the drum 27 and also surrounds the adjacent portion of the neck 26 of the drum 2. Tight joints are secured with the respective neck portions 26 and 32 of the two drums by means of stuffing boxes 36. The drum 27 is also provided with bearing rings 37 (Fig. 8) by which it may be rotatably mounted similarly to the drum 2. The two drums are driven in unison and may be connected with the same source of power. By reason of the helix in the interior of the drum 27, the solid material is constantly fed forward to the discharge end of the drum, while the solution flows back through the annular passage 33 into the chamber 34.

Figure 5:
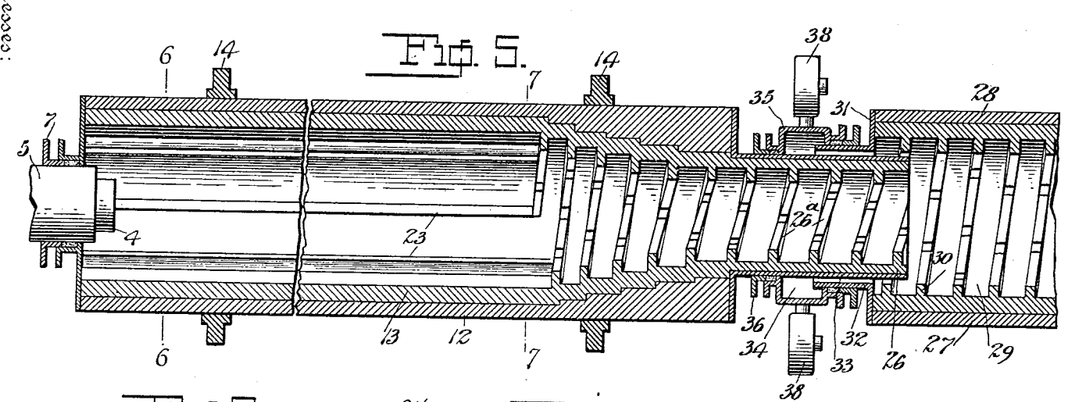
Fig. 5 is a broken longitudinal sectional view of one portion of the apparatus shown in Fig. 2.
Figure 6:
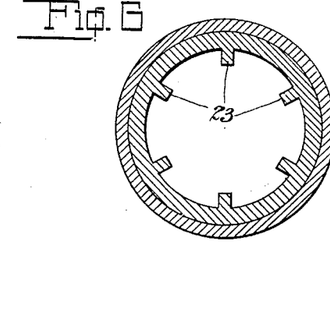
Fig. 6 is a transverse sectional view on line 6—6 of Fig. 5.
Figure 7:
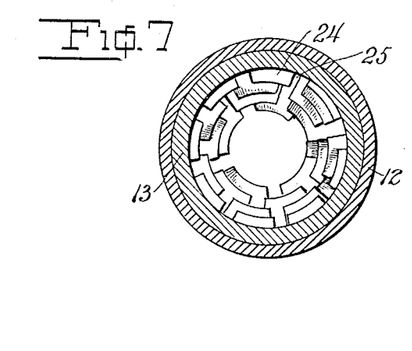
Fig. 7 is a similar view on line 7—7 of Fig. 5.
Figure 12:
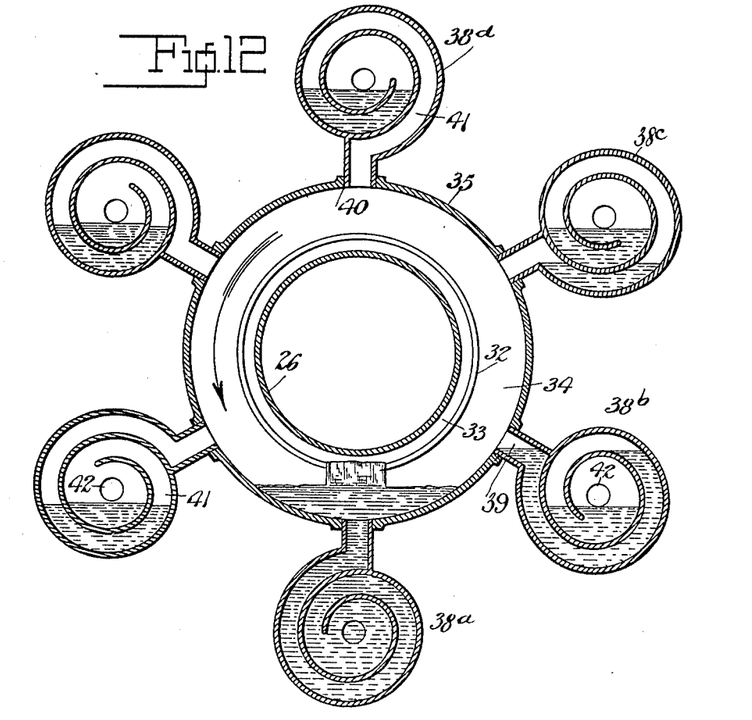
Fig. 12 is a detail view on enlarged scale of the discharge means for the solution and washings.
Figure 13:
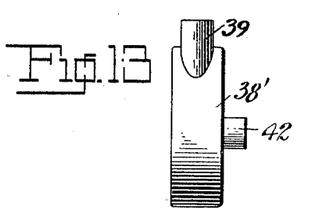
Fig. 13 is a similar view of one of said discharge elements.
Figure 14:
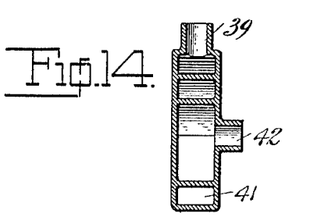
Fig. 14 is a vertical transverse section through one of the discharge means.

The chamber 34 is provided with a series of discharge boxes 38 (Fig. 5). These discharge boxes are of such construction that while they permit the solution to be discharged from the drum, they prevent any access of outside air to the interior of the drum as well as the escape of any gases or vapors therefrom. The construction of these discharge boxes is shown on enlarged scale in Figs. 12 13 and 14, where the chamber 34 is shown provided with six of such discharges. These discharge boxes are arranged radially at intervals around the periphery of the chamber 34. As they are all of the same construction and arrangement, a description of one of them will suffice. A cylindrical box or chamber $38'$ is provided, having a radial tubular inlet 39 which is threaded into one of the threaded radially arranged openings 40 in the casting 35 forming the chamber 34, or secured to the said chamber in any other suitable manner. The interior of the box or chamber $38'$ is in the form of a spiral passage 41 as clearly shown in Fig. 12, the outer end of which communicates with the chamber 34 through the inlet 39. The inner end of the spiral passage 41 communicates with a central axial outlet 42. The spiral passage 41 is so formed as to be coiled in the reverse direction to that of the rotation of the drums and chamber 34. The action of this spiral discharge is as follows: As the chamber 34 rotates, the inlet to the discharge is carried below the level of the solution in the chamber 34 as shown in the lowermost discharge box in Fig. 12 indicated by $38^a$. This discharge box immediately fills with the solution which follows the course of the spiral and is conducted to the outlet 42 through which it is discharged. As the chamber 34 continues to rotate, the spiral discharge $38^a$ reaches the position $38^b$ in which its inlet is carried above the level of the solution in the chamber 34, and the solution in the discharge box in the outer portion of the spiral flows in the reverse direction back into the drum. In the inner portion of the spiral discharge, the solution continues to discharge from the central axial outlet 42 until the liquid level falls below that of the outlet. As the drum continues to rotate, the discharge box reaches the position $38^c$, the solution remaining in the outer portion of the outer passage continuing to flow back into the chamber 34. The continued rotation of the drum brings the discharge box into its uppermost position $38^d$ in which the solution in the outer portion of the spiral passage 41 has all drained back into the chamber 34. The solution remaining in the inner portion of the spiral passage finding no escape, remains therein and forms a trap or seal preventing access of air from the outside to the drum, and also preventing escape of gases or vapors from the interior of the drum. It will be understood that the action of all of the spiral discharge boxes 38 is the same, each filling and discharging as it reaches the lower position, and always sealing the outlet from the passage of gas or vapor. A tank 43 (Figs. 1 and 2) is arranged to receive the discharge from the discharge boxes 38.

Figure 8:
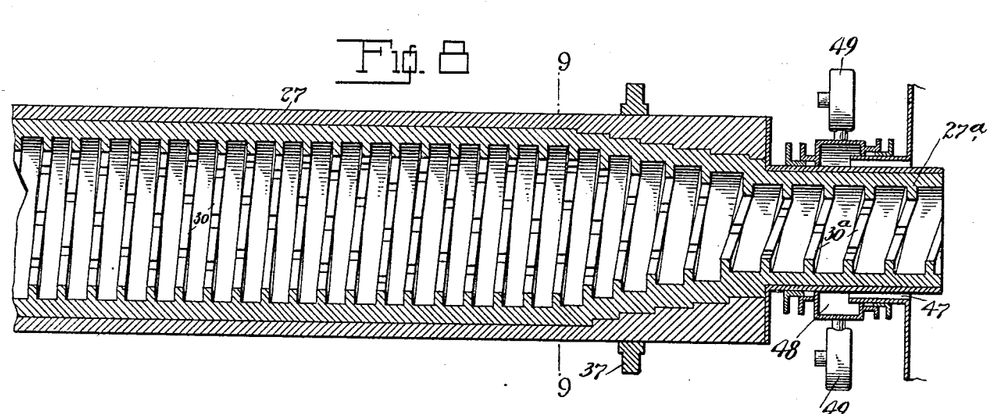
Fig. 8 is a longitudinal sectional view of the portion of the apparatus which I have termed the separating portion or drum.
Figure 9:
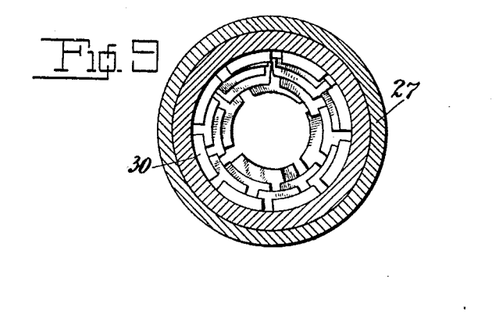
Fig. 9 is a transverse sectional view on line 9—9 of Fig. 8.
Figures 10, 11:
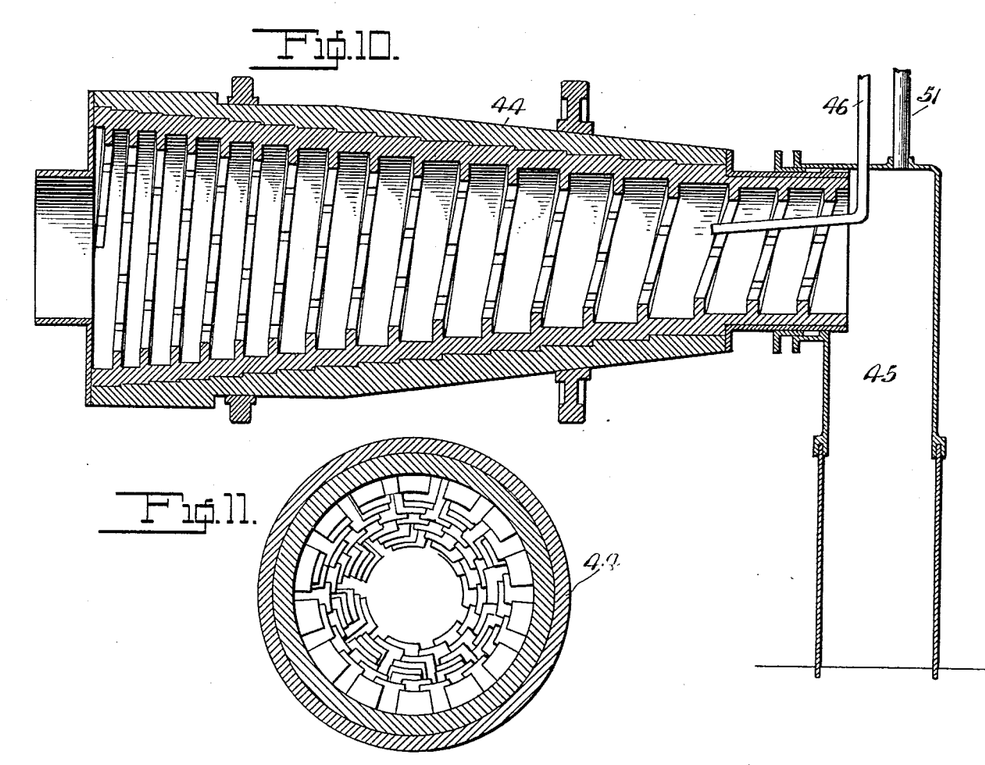
Fig. 10 is a longitudinal sectional view of the washing portion or drum of the apparatus and the tailings discharge.
Fig. 11 is an end view from the left of Fig. 10 with the head removed.

The drum 27 is formed at its discharge end in a manner similar to the drum 2 and has a similar connection with the washing drum 44, (Figs. 8 and 10). As the connections between drums 2 and 27 have been fully described it is unnecessary to describe in full the connections between the drum 27 and the washing drum 44, such construction and arrangement being the same as that of the drums 2 and 27.

The washing drum 44 is of similar construction to the drums 2 and 27, but of different form, being conical throughout its length and provided throughout with the interrupted conical helix of varying pitch, so that the rate of discharge is uniform notwithstanding the diminishing area of the drum. This drum is also provided with bearing rings as described for drums 2 and 27, and is intended to rotate in unison with these drums and may be driven from the same or any other suitable source of power. The discharge end of the wash-drum 44 communicates with a trunk 45 into which the tailings are discharged. This trunk and stuffing box connection at the end of the drum is clearly shown in Fig. 10. A pipe 46 for wash water is led into the discharge end of the washing drum 44. It will be understood that the tailings are thoroughly exposed to the wash water to free them from solution adhering thereto and admixed therewith. The washings flow back through annular passage 47 into an annular chamber 48 (Fig. 8) of the same construction and arrangement as the annular passage 33 and chamber 34 respectively, already described. The chamber 48 is also provided with the spiral discharge boxes 49 of the same construction and operation as the discharge boxes 38 already described. A tank 50 (Fig. 1) is provided to receive the washings from the spiral discharges 49. A pipe 51 is provided near the top of the tailings trunk to conduct away the fumes and gases escaping from the drums.

While I have shown the three drums, viz: the reaction drum 2, the separating drum 27 and the washing drum 44 as separate drums connected together, they may be constructed as a single drum as they form in fact one continuous drum or conduit for the ore of which the feed end is the reaction portion, in which the dissolving agent acts upon the ores and dissolves out the metal; the next succeeding portion is the separating portion in which the solution formed is separated from the solids, and the last portion is the washing portion in which the solids are washed free of the solution. If desired, and where dilution of the solution is not objectionable, washing may be performed in the second portion and the washing portion 44 dispensed with.

Figure 1:
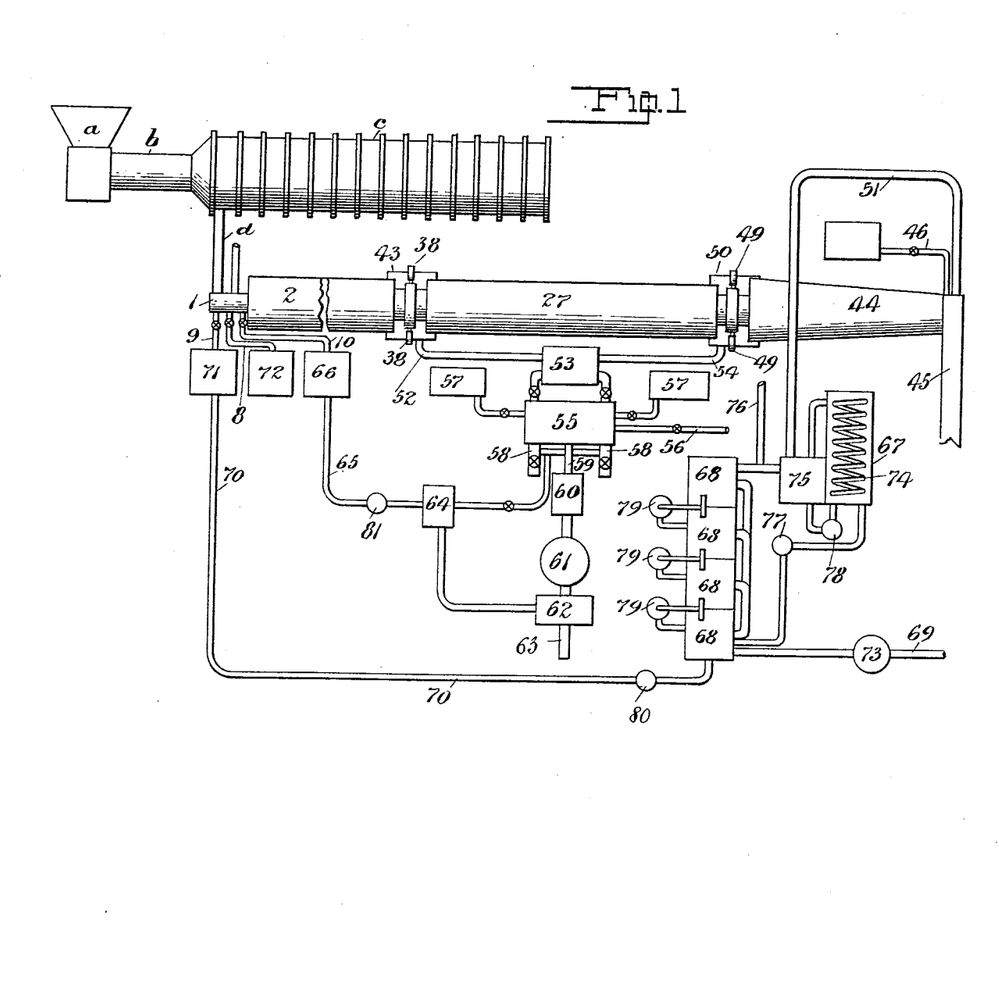
Figure 1 represents a general plan and diagrammatic view of the system.

Referring to the diagrammatic view, Fig. 1, of the system, the solution collected in the tank 43 is delivered by a pipe 52 to a tank or receptacle 53. With this tank 53 the tank 50 may also be connected as by a pipe 54, whereby the washings from tank 50 and the solution from tank 43 are both delivered to the receptacle 53. From the tank 53, the solution and washings are led to a filter 55. This filter may be of any suitable construction for the purpose of separating the solution from the slimes carried thereby. Various makes of filters are known for this purpose, some operating as pressure filters, some as vacuum filters and some of other types. In the drawing, Fig. 1, I have shown a pipe 56 which, if the filter be of the pressure type, will carry compressed air to one side of the filter and if the filter be of the vacuum type will represent the exhaust pipe from the under side of the filter. Also connected with the filter are wash water tanks 57, 57 for washing the slimes on the filter to free the same as far as practicable from all traces of solution. The discharge from the filter for the slimes and solids is shown at 58, 58. The discharge for the filtered solution is shown at 59 and leads to an evaporator or concentrator 60. This evaporator or concentrator 60 may consist of any suitable form of apparatus for evaporating and concentrating the solution to a greater density. In some cases, it may not be necessary to concentrate the solution, and this evaporation or concentration may be dispensed with. From the filter 55, or from the evaporator 60, the solution is led to a crystallizing apparatus 61. The apparatus employed for this purpose effects the crystallizing out of the metal salt from the solution. In the instance herein described, by treating the ores with sulfuric acid, the metal salt formed is copper sulfate. This crystallizing apparatus must be of such character as will effect a rapid crystallization of the solution. While any suitable form of crystallizing apparatus which will accomplish the result may be employed for this purpose, I have devised a form of crystallizer which is shown and described in my application for U. S. Letters Patent, Ser. No. 494,119, filed May 5th, 1909, in which the solution is delivered to a vacuum chamber where the heat is suddenly abstracted and crystallization effected. The present invention, however, is not intended to be limited to the use of this particular form of crystallizer, but other forms may be employed. It is also obvious that some form of precipitation other than crystallization may be substituted for that herein shown. From the crystallizer, the solution and crystals carried thereby are delivered to a filter or separator 62 in which the crystals are separated from the solution and discharged at 63. The solution separated from the crystals is conducted to an evaporating or concentrating apparatus 64. The washings from the slimes filter 55 may also be conducted to this evaporator 64. From this evaporating or concentrating apparatus, the solution is conducted through a pipe 65 to a reservoir tank 66 from which the solution is returned to the reaction drum 2 through pipe 10.

When nitric acid is employed in the reaction drum, the nitrous fumes developed may be led from the tailings trunk 45 through pipe 51 to a recovery apparatus first passing through a condensing apparatus 67 in which the steam accompanying the fumes is condensed and separated from the latter and the fumes then conducted to a series of absorption towers 68. Any waste gases from the absorption towers are led off through a waste gas discharge 69. The recovery apparatus for the acid fumes is not described herein in detail for the reason that the same is fully set forth and described in my application Ser. No. 513,272, filed August 17th, 1909. The acid collected in the recovery towers 68 is conducted by a pipe 70 to a tank or reservoir 71 from which acid as desired is led through the pipe 9 to the reaction drum. A tank or reservoir 72 is provided for sulfuric acid, from which said acid is led to the reaction drum through pipe 8, when needed.

Having described the apparatus suitable for carrying out the process, the treatment of the ore and the operation of the same will now be described.

The crushed ore is fed into the reaction drum 2 either from the amphidizer or in its original condition from hopper 1. Sulfuric acid when required is admitted in suitable quantity to the drum through the pipe 8 together with steam through the pipe 11. The proper quantity of acid may be adjusted to the character of the ore treated and to other conditions existing in the situation to be met, and will of course also depend somewhat upon whether or not previous amphidation is employed. Heretofore in acid leaching processes the principle appears to have been, so far as I am aware, to use a quantity of acid sufficient merely or only slightly more than sufficient to be neutralized by the values in the ore. According to my invention I employ and am able to employ an excess of acid and find that the rate of solution or extraction is thereby considerably accelerated. Steam is also admitted through pipe 11 to supply heat—a temperature of about 90°–94° C., being maintained. The crushed ore is constantly stirred, picked up by the longitudinal ribs 23 and dropped and all parts thereof thoroughly presented to the action of the acid, and, by reason of the construction and arrangement of the drum, is maintained in contact with the acid a sufficient length of time to insure a practical exhaustion of the values or copper from the ore. This is due to the drum being straight or level and cylindrical throughout its length except for a comparatively short section at the end next the separating drum, and also to the interrupted form of the helix at this end which permits the liquids to a large extent to drain back and be retained in the reaction drum to act on the ore, while the more solid material is carried forward into the succeeding drum. The solution or liquid thus remains longer in the reaction drum, thereby maintaining the level of the liquid in that drum at sufficient height to cause the reaction drum to constantly overflow into the separating drum as fresh liquid and ore are fed in.

Where an oxidation step is necessary in the drum 2, I supply nitric acid to the feed end of the drum from a reservoir 71 through pipe 9. One action of the nitric acid is to convert the sulfids and metallic copper into oxids, which are dissolved by the sulfuric acid forming sulfates. In this action the nitric acid is reduced to nitric oxid, NO being formed. It is to be noted in this connection that air is excluded from the reaction drum. Where air is employed in said drum it is impracticable to maintain the heat except at too great a steam pressure, and also the oxidation by the nitric acid is retarded. The nitric oxid formed, with the steam and vapor pass through the drums to the tailings trunk 45 and are withdrawn by the aid of an exhaust pump 73, first passing through the condensing and absorption apparatus 67, 68. In order to regenerate nitric acid from the nitric oxid and other nitrogen oxids formed in the reaction drum these gases must be first cooled and separated from the steam accompanying them. This is effected in the condenser 67, which consists of a tank with a coil 74 therein. Cooled water is circulated through said coil to cool the water in tank 67. This tank communicates with the base of a tower 75. The nitrous fumes from the drums are led to the base of this tower and bubble up through the cooled water in the base thereof to the top. This tower is sprayed with cooled water throughout its height, so that the gases are further cooled and the vapors or steam condensed. From the top of this tower 75 the gases are led to the base of the first of the acid recovery or absorption towers 68. At a point between the condenser tower 75 and the absorption towers 68 air is introduced and mingled with the fumes on their way to the absorption towers. This admission of air is represented by the air inlet pipe 76 (Fig. 1). It will be understood that suitable pumps or monte-jus apparatus are provided to lift or convey the water and acid to the desired parts of the apparatus, such pumps or the like being represented at 77, 78 and 79. From the last of the acid recovery towers the acid is led by pipe 70 to the reservoir 71 for use in treating fresh bodies of ore as desired, a pump 80 or the like being employed to pump the acid to said receptacle. As the particular condensing and acid recovery apparatus herein referred to is fully described and shown in my application for Patent Ser. No. 513,272, filed August 17th, 1909, a detailed description and illustration herein is not necessary and would moreover unduly extend the present specification. I do not intend to be understood as limiting the present invention to any particular form of acid recovery apparatus, since such apparatus in general is known and understood and any efficient form of apparatus for that purpose may be employed. It is to be borne in mind, however, that condensation and cooling the fumes are necessary to the recovery of the nitric acid, as the latter tends to decompose at a comparatively low temperature. It will thus be seen that where nitric acid is employed for oxidation, the quantity used and consequently the cost thereof is small, since, after starting the process, only sufficient additional acid is required to replace losses from time to time, the greater part of the original acid being recovered and reused.

The ore treated and slimes and solution formed in the reaction drum 2 are gradually withdrawn from the end of said drum by the action of the conical helix, fresh ore and dissolving agents being constantly fed in at the feed end of the drum. The slimes and solution are carried to the separating drum 27 wherein they overflow into chamber 34 and are discharged into tank 43. The solid and heavy portions forming the tailings are carried forward by the helix in said drum 27 to the washing drum 44 where they are exposed to the action of wash water from pipe 46. This wash water forming a weaker solution is discharged into tank 50. The solution and slimes and washings are next delivered to the filter 55 wherein the solution is filtered from the slimes. In this filter the washings from drum 44 may be employed for washing the slimes deposited on the filter bed; or additional wash water from supply tanks 57 may be used for this purpose. The layer of slimes deposited on the filter bed is scraped off from time to time and discharged through outlets 58. The solution obtained from the drums and filtered is still hot and if of sufficient concentration may be immediately crystallized. This crystallization is preferably performed by the type of crystallizer fully described and shown in my application Ser. No. 494,119, hereinbefore referred to in which I obtain a sudden drop in temperature by means of exposing the hot solution to a sudden reduction of vapor pressure in a vacuum chamber. The hot solution being of a certain degree of concentration at which it holds a certain proportion of substance in solution will, on being subjected to a sudden drop in temperature (due to the reduced vapor pressure) precipitate a portion of the substance—copper sulfate—in the form of crystals, the amount deposited as crystals being proportional to the drop in temperature and the solubility curve of the substance. The crystals formed are separated from the solution in any suitable filter or separating apparatus 62 and are discharged at 63. They may be subjected to re-crystallization if desired and marketed, or marketed in their crude form; or they may be smelted to recover metallic copper, or electrolyzed in the form of a solution. It is to be noted that where smelting of the crystals is performed the material smelted is considerably richer in copper than the usual material smelted in the form of ore, and this smelting besides giving a richer and purer yield is greatly simplified in that there is no gangue or slag to be handled and got rid of.

In treating a given ore body according to the above mentioned process of chemical extraction and concentration practically all of the values in the ore are recovered in a short time, tests having shown an extraction within a few minutes of over 90% of the copper in a 2% to 4% copper ore whereas the ordinary mechanical concentration of ore in practice yields a recovery of only 60% of the values as an average. Indeed my process works efficiently on the rejected tailings of mechanical concentration, from which recovery of the values in this waste is impossible by ordinary concentrating and smelting methods. This advantage taken in connection with the greatly superior product obtained for smelting, where that process of recovery of the metal is resorted to, renders my invention of great practical value.

The impoverished solution from the crystallizer 61 and filter 62 is returned to the reaction drum 2 through pipe 65 where it takes up fresh value from the ore. On the way it may pass through a heater 64 in which its temperature is raised and if desirable the solution concentrated by evaporation. The treatment of the ore with this solution in conjunction with the acid greatly promotes solution or extraction of the values from the ore, since said values pass more readily into solution in the presence of metallic salts. The solution from the crystallizer is still rich in sulfuric acid, since it contains the original acid diminished only by the amount taken up in forming the copper sulfate of the crystals formed.

It will be seen from the above description that the copper sulfate solution circulates through the apparatus giving up a portion of its copper sulfate in the crystallizer and returning to the drum takes up again an additional increment of copper from the ore. It is thus this increment which is recovered in each circuit of the solution. By this method of crystallizing out the increment, the strength of the dissolving solution is little impaired and relatively small quantities of additional or fresh acid are required to maintain the strength of the solvent to insure rapidity of extraction. The necessity of removing all of the sulfate from the solution being obviated, the separation is greatly simplified, as the difficulty of separating out the crystals increases with the weakening of the solution.

I claim:

1. In apparatus of the character described for the treatment of copper ores, the combination with means for continuously amphidizing the copper, and means for continuously dissolving the amphid; of means for continuously separating the solution from the gangue, and means for crystallizing and separating the amphid from the solution.

2. In apparatus of the character described for the treatment of copper ores, the combination with means for continuously amphidizing the copper, and means for continuously dissolving the amphid; of means for continuously separating the solution from the gangue, means for continuously filtering the solution and means for crystallizing and separating the amphid from the solution.

3. In apparatus of the character described for the treatment of copper ores, the combination with means for continuously amphidizing the copper, and means for continuously dissolving the amphid; of means for continuously separating the solution from the gangue, means for continuously discharging the gangue, and means for crystallizing and separating the amphid from the solution.

4. In apparatus of the character described for the treatment of copper ores, the combination with means for continuously amphidizing the copper, means for continuously dissolving the amphid, means for continuously separating the solution from the gangue, means for continuously and separately discharging the gangue and solution while excluding the entrance of air, and means for separating the amphid from the solution.

5. In apparatus of the character described for the treatment of copper ores, the combination with means for continuously amphidizing the copper, means for continuously dissolving the amphid, means for continuously separating the solution from the gangue, means for continuously and separately discharging the gangue and the solution while excluding the entrance of air, means for continuously filtering the solution and means for separating the amphid from the solution.

6. In apparatus of the character described for the treatment of copper ores, the combination with means for continuously amphidizing the copper, means for continuously dissolving the amphid, means for continuously separating the solution from the gangue, means for continuously and separately discharging the gangue and solution while excluding the entrance of air, and means for crystallizing and separating the amphid from the solution.

7. In apparatus of the character described for the treatment of copper ores, the combination with means for continuously amphidizing the copper, means for continuously dissolving the amphid, means for continuously separating the solution from the gangue, means for continuously and separately discharging the gangue and the solution while excluding the entrance of air, means for continuously filtering the solution, and means for crystallizing and separating the amphid from the solution.

8. In apparatus of the character described, the combination with primary and secondary amphidizers, means for continuously feeding crushed ore into the primary amphidizer, means for continuously discharging the resultant mass from the primary amphidizer into the secondary amphidizer, means for dissolving the amphid produced, means for separating the solution from the gangue, means for continuously and separately discharging the gangue and the solution, and means for separating the amphid from the solution.

9. In apparatus of the character described, the combination with the primary and secondary amphidizers, means for continuously feeding crushed ore into the primary amphidizer, means for continuously discharging the resultant mass from the primary amphidizer into the secondary amphidizer, means for continuously dissolving the amphid produced, means for continuously separating the solution from the gangue, means for continuously and separately discharging the gangue and the solution, means for continuously filtering the solution and means for separating the amphid from the solution.

10. In apparatus of the character described, the combination with the primary and secondary amphidizers, means for continuously feeding crushed ore into the primary amphidizer, means for continuously discharging the resultant mass from the primary amphidizer into the secondary amphidizer, means for continuously dissolving the amphid produced, means for continuously separating the solution from the gangue, means for continuously and separately discharging the gangue and the solution, means for crystallizing the amphid in the solution and means for separating the crystals from the solution.

11. In apparatus of the character described, the combination with the primary and secondary amphidizers, means for continuously feeding crushed ore into the primary amphidizer, means for continuously discharging the resultant mass from the primary amphidizer into the secondary amphidizer, means for continuously dissolving the amphid produced, means for continuously separating the solution from the gangue, means for continuously and separately discharging the gangue and the solution, means for continuously filtering the solution, means for crystallizing the amphid from the solution and means for separating the crystals from the solution.

12. In apparatus of the character described for the treatment of copper ores, the combination with means for continuously amphidizing the copper including means for continuously supplying nitric acid to the copper, means for continuously dissolving the amphid produced, means for continuously separating the solution from the gangue, means for recovering the resultant nitrous fumes, converting them to nitric acid and returning the nitric acid to treatment of further bodies of ore, means for separating the amphid from the solution, and means for returning the depleted solution to the treatment of subsequent bodies of ore.

13. In apparatus of the character described for the treatment of copper ores, the combination with a primary amphidizer adapted to amphidize a portion of the copper without the addition of outside acid, a secondary amphidizer, means for continuously feeding the crushed ore into the primary amphidizer, means for continuously discharging the resultant mass from the primary amphidizer into the secondary amphidizer, means for supplying nitric acid and sulfuric acid to the secondary amphidizer to complete the amphidation of the copper, means for continuously dissolving the amphid produced, means for continuously separating the solution from the gangue, means for recovering the resultant nitrous fumes, converting them into nitric acid and returning them to the secondary amphidizer, means for separating the amphid from the solution, and means for returning the depleted solution to the secondary amphidizer.

14. In apparatus of the character described, the combination with a closed rotary drum, and means for feeding materials and reagents thereto; of means for separating liquids from solids and spiral discharge passages for the liquids forming air seals.

15. In apparatus of the character described, the combination with a closed rotary drum, and means for feeding materials and reagents thereto; of a conical discharge neck for the solids, and spiral discharge passages for the liquids forming air seals.

16. In apparatus of the character described, the combination with a closed rotary drum, and means for feeding materials and reagents thereto; of a conical solids discharge neck having interrupted helical ribs of increasing pitch toward the smaller end.

17. Apparatus of the character described, comprising in combination a closed rotary drum, means for feeding materials and reagents thereto, and spiral discharge means forming air seals.

CHARLES S. BRADLEY.

Witnesses:
OCTAVIUS KNIGHT,
M. G. CRAWFORD.

---

Copies of this patent may be obtained for five cents each, by addressing the "Commissioner of Patents, Washington, D. C."